United States Patent [19]

Epstein et al.

[11] 4,123,557

[45] Oct. 31, 1978

[54] MEANS FOR EFFECTING IMPROVEMENT IN THE MANUFACTURE OF COMMINUTED MEAT PRODUCTS

[76] Inventors: Felix Epstein; Peter R. Epstein, both of 33-33 Greenpoint Ave., Long Island City, N.Y. 11101

[21] Appl. No.: 799,984

[22] Filed: May 24, 1977

[51] Int. Cl.$^2$ ............................................. A22C 11/00
[52] U.S. Cl. .................................... 426/105; 426/646
[58] Field of Search ............... 426/574, 583, 646, 652, 426/657, 105

[56] References Cited

U.S. PATENT DOCUMENTS

| | | | |
|---|---|---|---|
| 2,602,746 | 7/1952 | Meade | 426/583 |
| 3,050,400 | 8/1962 | Poarch et al. | 426/646 |
| 3,711,291 | 1/1973 | Leidy et al. | 426/646 X |
| 3,900,576 | 8/1975 | Schulz | 426/652 X |
| 3,911,143 | 10/1975 | Colmey et al. | 426/583 |

*Primary Examiner*—Robert A. Yoncoskie
*Attorney, Agent, or Firm*—A. J. Nydick

[57] ABSTRACT

This invention relates to the production of comminuted meat products wherein the binding of the principal components, i.e., meat, fat and water is achieved with the effectiveness that is obtainable with undenatured myosin. This effectiveness results from the use, as binding agent, of milk ingredients characterized by a ratio of lactose to total protein thereof of about the order of 3:2; and that the ratio of casein to serum protein in the protein content of the binding agent is about 1:1.

8 Claims, No Drawings

MEANS FOR EFFECTING IMPROVEMENT IN THE MANUFACTURE OF COMMINUTED MEAT PRODUCTS

BACKGROUND OF THE INVENTION

This invention relates to the production of comminuted meat products; and is directed primarily to: (A) effectuating improved binding of the principal components of such products, i.e., the meat, fat and water; and (B) a novel product which makes it possible to achieve the aforementioned improved binding effect by using a milk (dairy) albuminate.

In "Science of Meat and Meat Products" published by the American Meat Institute Foundation, it is stated that one of the best proteins which effectuates the desired binding is provided by the undenatured myosin portion of the red muscle meat of bulls and cows; and the best binding power is obtained within the first 48 hours after slaughter; i.e., before rigor mortis sets in. Such meat is known as "hot" meat.

The use of such "hot" meat is impracticable under present day manufacturing techniques; and has been discontinued.

The meats which serve as the bases for products such as bologna, frankfurters, luncheon meats, etc., are either much older than 48 hours or indeed, frozen. When rigor mortis sets in, lactic acid is formed, and, in consequence thereof, the soluble proteins undergo denaturation. Hence, the binding components present in the freshly slaughtered meat are greatly reduced or, in fact, have been inactivated by the time the meat enters into the manufacture of the comminuted products.

THE INVENTION

In view of the lack of binding effectiveness in comminuted meat products which are devoid of undenatured myosin, the art has sought for materials which provide the desired binding characteristics of undenatured myosin. The art has directed its attention to obtain the desired result by the use of skim milk and calcium reduced skim milk. Illustrative of such attempts to achieve the desired effects are U.S. Pat. Nos. 3,050,400 (Poarch and Gwodz) and 3,235,386 (Mykleby). The attempts so to do have failed to produce the desired effects.

Accordingly, the art has long sought for a binding agent that would indeed produce the effect that is achieved by the use of undenatured myosin.

It has now been discovered that the effectiveness long sought for by the art is achievable by the novel binding agent of this invention which produces the effect obtainable by the use of undenatured myosin.

OBJECTS OF THIS INVENTION

It is among the principal objects of this invention to provide a comminuted meat product (frankfurters, bologna, luncheon meats, etc.) of especially improved characteristics as compared with those presently on the market.

A further object of the invention is to provide improvements in the processing of the components which enter into the formation of the end product.

A still further object of the invention is to provide the art with a binding agent that makes it possible markedly to improve the processing of the substances entering into the formation of the meat product.

In its fundamental aspects, the foregoing principal objects of this invention, as well as other objects and advantages, are achieved by this use of a binding agent for the principal components of the comminuted meat product of a milk (dairy) albuminate, characterized by a lactose - to - protein content of 38–50: 28–35, i.e., of the order of 3:2 and wherein the ratio of the casein - to - serum protein in the protein content is 7-to-20:: 14–24, or approximately 1:1.

THE BINDING AGENT

The binding agent is a combination of lactose and solubilized milk proteins. Those proteins are: (I) the serum proteins, also known as Albumin Protein, and (II) casein, the proportion of I and II being 14–24 to 7–20. The binding agent may be prepared by mixing those components.

However, the binding substance or agent of this invention can adventageously be prepared by processing defatted sweet whole milk through the following stages: precipitating the casein (in whole or in part). If the casein has been fully precipitated, it may be subsequently restored in the required amount. After decaseinization, the liquor is processed to precipitate the lactose to the extent desired. The residual liquor is processed by alkali treatment to effectuate solubilization of its insoluble protein content, and subjected to any of the various well-known drying methods.

Accordingly, the defatted milk is treated by conventional procedures, as by means of rennet or hydrochloric acid. The pH thereof is lowered to 4.7, the casein being precipitated and removed. The resultant serum contains interalia, serum proteins, principally lactoglubulins and lactalbumins, which are not denatured.

Then part of the lactose content is crystallized out to the extent desired and removed by centrifugation.

The residual serum is then treated to effect solubilization of insoluble protein present with the albumin. This is achieved by processing with a food grade alkali such as sodium hydroxide; e.g., a 10% solution. The resultant liquid has a pH of 8.3. If a lower pH is desired, the liquid can be treated with food grade hydrochloric acid. The liquid, (mother liquor) is then passed to and through a suitable dehydrating unit, as for example, a roller dryer or a spray dryer, drum dryer or a freeze dryer.

The dry product thus obtained may have the following composition:

| Albumin Protein | Percent | 14 – 24 |
|---|---|---|
| Casein | " | 7 – 20 |
| Minerals (Ash) | " | 7 – 22 |
| Moisture | " | 3 – 5 |
| Fat | " | 0 – 2 |
| pH | " | 6.8 – 8.3 |

This product functions effectively as an emulsifier for the manufacture of comminuted meat products. The soluble protein content thereof undergoes coagulation during the ensuing thermal processing of the emulsion to produce the desired end product.

It is to be noted that lactose-to-protein ratio of this emulsifying agent is preferably 3-to-2.

In the following description of several types of comminuted meat products, there was used such a binding agent, the analysis of which was:

| | Percent |
|---|---|
| Total Protein | 31.0 |
| Serum Protein 14.3 | ) |

-continued

|  | Percent |
| --- | --- |
| Casein | 16.7 |
| Lactose | 46.7 |
| Ash | 18.6 |
| Moisture | 3.0 |
| Fat | 0.6 |
| pH | 8.3 |

PREPARATION OF COMMINUTED MEAT PRODUCTS
FRANKFURTERS AND BOLOGNA
THE MIXER-EMULSIFIER PROCESS

| Bovine Meat | 200 lbs. | 90.72 Kg. |
| --- | --- | --- |
| Pork Trimmings (50% Fat) | 300 lbs. | 136.08 Kg. |
| Ice | 100 lbs. | 45.36 Kg. |
| Binding Agent | 25 lbs. | 11.34 Kg. |
| Salt | 14½ lbs. | 6.58 Kg. |
| Spices | 2 lbs. | .91 Kg. |
| Corn Sugar | 10 lbs. | 4.54 Kg. |
| Sodium Nitrite | 1¼ ozs. | 35.44 grams |

The bovine meat was ground in a meat grinder with 1/16 inch diameter holes in the grinder plate. The pork trimmings were ground in the same grinder using a grinder plate with ⅛ inch diameter holes.

The ground bovine meat was placed into a "silent cutter" food chopper together with 80 lbs. of ice and the chopper started. At the end of 1 minute spices were added, after 2 minutes running time the sodium nitrite was added. At the end of 4 minutes the binding agent and the remainder of the ice (20 lbs.) was added plus the corn sugar and the ground pork trimmings. The mixture was chopped an additional 4 minutes. At this point the batter had a final temperature of 48°–52° F. and possessed the proper bound characteristics with a fine, smooth homogeneous texture.

Alternatively the ground meats may be placed in a mixer together with the ice, sodium nitrite and mixed for 1 minute. After this 1 minute mixing the Binding Agent, salt, spices and corn sugar are added, and mixing continued for about another 2–3 minutes. The mixture is then run through an emulsifier with either 1 or 2 plates to as fine a consistency as is desired. It can be noticed that the emulsion is loose and easily workable which is very desirable. The emulsion is then stuffed and cooked in the manner known to this art.

| LIVER PASTE OR SPREAD | | |
| --- | --- | --- |
| Trimmed Pork Livers | 135 lbs. | 61.24 Kg. |
| Skinned Pork Jowls | 120 lbs. | 54.43 Kg. |
| Bovine Meat | 15 lbs. | 6.80 Kg. |
| Binding Agent | 40 lbs. | 18.14 Kg. |
| Salt | 7½ lbs. | 3.40 Kg. |
| Corn Sugar | 1¼ lbs. | .57 Kg. |
| Spices | 2 lbs. | .91 Kg. |
| Onions, chopped | 2½ lbs. | 1.13 Kg. |
| Sodium Nitrite | ½ ozs. | 14.18 grams |

The skinned pork jowls were ground in a meat grinder using a 3/16 inch diameter holes in the grinder plate. The bovine meat was ground in the same grinder using a grinder plate with ⅛ inch diameter holes. The ground meat, liver, and all other ingredients were placed into a high speed "silent cutter" and chopped 3 to 3½ minutes.

The product was stuffed into casings, smoked and cooked the normal way, as known to the art.

| COOKED SALAMI | | |
| --- | --- | --- |
| Bovine Meat | 150 lbs. | 68.100 Kg. |
| Pork Trimmings | 100 lbs. | 45.400 Kg. |
| Lean Pork Shoulder Meat | 75 lbs. | 34.050 Kg. |
| Pork Cheek Meat | 50 lbs. | 22.700 Kg. |
| Pork Hearts | 125 lbs. | 56.750 Kg. |
|  | 500 lbs. |  |
| Ice | 45 lbs. | 20.430 Kg. |
| Spices | 2 lbs. | 908 grams |
| Salt | 13½ lbs. | 6.129 Kg. |
| Sodium Nitrite | 1¼ ozs. | 35.5 grams |
| Binding Agent | 10 lbs. | 4.540 Kg. |
| Corn Sugar | 5 lbs. | 2.270 Kg. |

The meats were ground in a meat grinder with 3/16 inch diameter holes in the grinder plate, except for the bovine meat which was ground through the grinder with ⅛ inch diameter holes in the grinder plate. After grinding the ground meats were placed in a mixer together with the ice, spices, salt, sodium nitrite, corn sugar and the binding agent. The materials were mixed until a homogenous blend was obtained. The product was stuffed into casings, smoked and cooked in the normal way, as known to the art.

A notable advantage of the Binding Agent of this invention is that it has a larger amount of solubilized albumin than any non-fat dry milk or calcium-reduced non-fat dry milk. The soluble albumin keeps the raw emulsion loose and thinner flowing which is a very important factor in the current modern high speed processing method.

In continuous frankfurter manufacturing machines, an easy flow of the raw mass through pipes and pumps is very important. The presence of the solubilized albumin of this invention makes the emulsion flexible and easy flowing.

Another improvement over any non-fat dry milk or calcium reduced non-fat dry milk is the ability of the undenatured albumin to form a fine film over meat particles; and, when heat is applied to the frankfurter, there is formed a fine, skin-like film, which is very desirable in continuous frankfurter processing. The fine albumin film formation coagulates when it is heated. Tests have established that higher temperatures than are used in conventional processes can be applied when the instant novel binding agent is used without fat separation or excessive moisture loss. It has also been established that one can make an emulsion finer with high speed equipment without over-heating, which could otherwise result in a "short" meat mass. This shortened emulsion would not bind properly, resulting in a crumbling product.

While the present invention has been illustrated by way of the foregoing specific examples, the present examples of this invention should in no way be limited thereto but should be construed as broadly as any and all equivalents thereof in the reading and comprehension of the appended claims.

We claim:

1. In a comminuted meat product comprising flesh meat, fat and water, the improvement which includes an effective amount of a binding agent comprising lactose and proteins of milk, the proteins being the serum proteins and solubilized casein in the respective ratio of about 1:1 by weight, and the ratio of lactose-to-proteins being, respectively, 38–50 to 28–35 parts by weight.

2. A comminuted meat product as defined in claim 1 whereof the lactose-to-protein ratio in the binding agent is approximately 3-to-2.

3. A product as defined in claim 1 which is a frankfurter.

4. A product as defined in claim 1 which is a bologna.

5. A product as defined in claim 1 whereof the flesh meat is selected from the group consisting of pork and beef.

6. In a process of making a comminuted meat product from flesh meat, fat and water which comprises comminuting the meat, fat and water, the improvement wherein during the comminution thereof there is included an effective amount of a binding agent which comprises: lactose and proteins of milk, the proteins being the serum proteins and casein in the respective ratio of about 1:1 by weight, and the ratio of lactose-to-proteins being, respectively, 38–50 - to 28–35 parts by weight.

7. A process as defined in claim 6 wherein the weight ratio of lactose-to-proteins is about 3-to-2.

8. A process as defined in claim 6 wherein the comminuted meat product is a sausage.

* * * * *